H. KELLER.
METHOD OF FORMING U-SHAPED TURBINE BUCKETS.
APPLICATION FILED NOV. 16, 1904.

930,383. Patented Aug. 10, 1909.

Witnesses.
Helen Alford
Alex. F. Macdonald.

Inventor.
Huldreich Keller.
by Albert G. Davis
Atty.

UNITED STATES PATENT OFFICE.

HULDREICH KELLER, OF BERLIN, GERMANY, ASSIGNOR TO GENERAL ELECTRIC COMPANY, A CORPORATION OF NEW YORK.

METHOD OF FORMING U-SHAPED TURBINE-BUCKETS.

No. 930,383.           Specification of Letters Patent.           Patented Aug. 10, 1909.

Application filed November 16, 1904. Serial No. 232,943.

*To all whom it may concern:*

Be it known that I, HULDREICH KELLER, a citizen of Switzerland, residing at Berlin, Germany, have invented certain new and useful Improvements in Methods of Forming U-Shaped Turbine-Buckets, of which the following is a specification.

Certain types of turbines are provided with wheels or stationary elements or both having U-shaped buckets formed in the curved surfaces or in the side faces of the wheels or stationary elements.

It has been proposed to use a double or step cutter for this purpose, but practice shows that this cannot be done successfully even where the buckets are symmetrically formed. Where they are unsymmetrically formed it is impossible to form them in this manner.

The object of the present invention is to improve the methods of forming these so-called U-shaped buckets.

In practicing the invention the blank, whether it be a wheel, ring or segment thereof, is first machined to the desired dimensions or approximately thereto. A cut-away portion or groove, usually a half-round, is then formed or turned in the surface or surfaces intended to be provided with buckets. The cut-away portion or groove is of such shape, size and location that it will, when the milling cutter is operating, receive the spindle thereof, and permit the cutter to enter the desired depth into the stock of the blank. The center of the cut-away portion or groove registers with the axes of the buckets when the latter are symmetrical in form, and is located at one side thereof when the buckets are unsymmetrical. The wheel, ring or segment thereof may be provided with one or more rows of buckets which have the same or different diameters. Buckets formed in accordance with the invention may be used in connection with the rotary or stationary parts, or both, of a steam or other elastic-fluid turbine.

Figure 1:
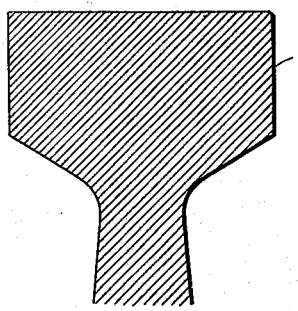
Figure 2:
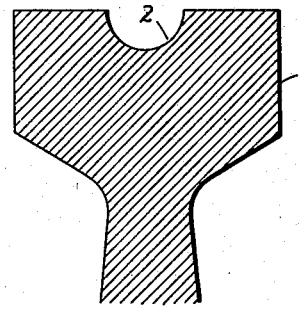
Figure 3:
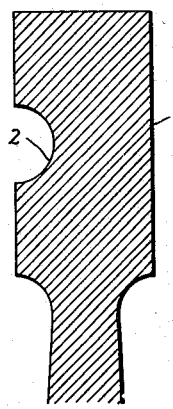
Figure 4:
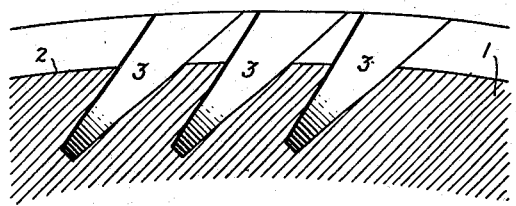

In the accompanying drawing, which illustrates the various steps in the manufacture of turbine elements in accordance with the invention, Figure 1 is an axial section of a finished blank suitable for a wheel or stationary element; Figs. 2 and 3 show elements with cut-away portions therein to receive the cutter spindles; Fig. 4 is a section of an element with finished buckets; and Fig. 5 is a sectional view of an unsymmetrical bucket.

The blank 1 is first machined to the proper size and shape for the particular purpose intended, as shown in Fig. 1, for example. The metal in the blank registering with the position of the spindle of the milling cutter in its several operating positions is then cut away. This is preferably done by turning one or more grooves 2 in the bucket-containing portion, as shown in Figs. 2 and 3. The groove may be, and preferably is, formed in the same machine and at the same time that the blank is finished, to save a separate operation and the necessary handling incident thereto. In Fig. 2 the cut-away portion is shown in the periphery, and in Fig. 3 on one of the side faces. Obviously the number of these cut-away portions can be duplicated at will, depending only upon the character of the part. The depth of the cut-away portion or portions depends upon the angle of each bucket with respect to a radius, also upon the size and shape of the spindle of the milling cutter. The next step is to cut the buckets and U-shaped pockets or working passages 3, as shown in Fig. 4, which may be done with a simple rotary milling cutter, the spindle for which enters the cut-away portion or groove 2 at each operation.

Figure 5:
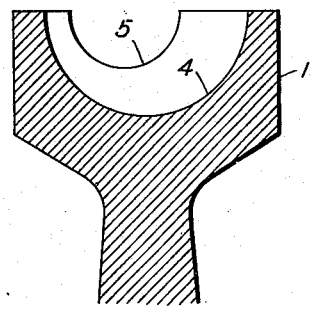

In Fig. 5 is shown an unsymmetrical bucket space, pocket or working passage 4. In this case the cut-away portion 5 is, or may be, somewhat larger than before.

What I claim as new and desire to secure by Letters Patent of the United States is,

The method of forming U-shaped pockets in turbine wheels, which consists in cutting a groove in the periphery of the wheel at a position corresponding to the axes of the pockets, and then forming the pockets by means of a rotary cutter having its shaft corresponding with the groove.

In witness whereof I have hereunto set my hand this eighteenth day of October 1904.

HULDREICH KELLER.

Witnesses:
 HENRY HASPER,
 WOLDEMAR HAUPT.